(12) United States Patent
Harding et al.

(10) Patent No.: US 6,184,869 B1
(45) Date of Patent: Feb. 6, 2001

(54) COMPUTER INPUT DEVICE HAVING MULTIPLE MULTI-DIMENSIONAL DETECTION DEVICES

(75) Inventors: Muir Lee Harding, Tualatin; William F. Hayhurst, Aurora, both of OR (US)

(73) Assignee: Matter and Motion, Inc., Tualatin, OR (US)

( * ) Notice: Under 35 U.S.C. 154(b), the term of this patent shall be extended for 0 days.

(21) Appl. No.: 09/164,401

(22) Filed: Sep. 30, 1998

(51) Int. Cl.$^7$ ........................................... G06F 3/02
(52) U.S. Cl. .................. 345/163; 345/164; 345/165; 345/166; 345/167
(58) Field of Search .................................. 345/163, 167, 345/164, 165, 166, 168

(56) References Cited

U.S. PATENT DOCUMENTS

| | | | | |
|---|---|---|---|---|
| 5,281,958 | * | 1/1994 | Ashmun et al. | 345/157 |
| 5,298,919 | * | 3/1994 | Chang | 345/163 |
| 5,832,323 | * | 11/1998 | Goto | 396/297 |

* cited by examiner

*Primary Examiner*—Richard A. Hjerpe
*Assistant Examiner*—Jean Lesperance
(74) *Attorney, Agent, or Firm*—ip Solon LLP

(57) ABSTRACT

A computer input device having multiple multi-directional detection devices that can be simultaneously operated by a user to provide multi-dimensional input to a computer is disclosed. The multi-directional detection devices are arranged on an input device housing to facilitate simultaneous operation by one hand of an operator. One multi-directional detection device may include a spherical ball located within the housing and protruding from a bottom surface of the housing so that when the housing is located on a horizontal surface and moved about, that ball rotates within the housing. Encoders detect the rotation of the ball and provide an indicative signal to circuitry located within the housing. Another multi-directional detection device may include a spherical ball located within the housing and protruding from a top surface of the housing. Encoders detect rotation of this ball and provide indicative signals to the circuitry. A user may directly manipulate the ball protruding from the upper surface while moving the housing, thus rotating the ball protruding from the bottom surface. The respective encoders from each detection device provide signals to the circuitry which in turn provides a multi-dimensional signal to a computer. A third multi-directional detection device may be provided that can be simultaneously operated with the first and second multi-directional detection devices. A third multi-directional detection device may be provided that can be simultaneously operated with the first or second multi-directional detection devices.

12 Claims, 3 Drawing Sheets

COMPUTER INPUT DEVICE HAVING MULTIPLE MULTI-DIMENSIONAL DETECTION DEVICES

BACKGROUND OF THE INVENTION

1. Field of the Invention

This invention pertains to the field of computer input devices and in particular pertains to input devices having multi-directional detection devices for providing multi-dimensional input to a computer to control operation of computer software.

2. Description of the Related Art

A computer user operates an input device to control software operating in a computer. The input device provides input signals to the computer program which then operates in a programmed manner in response to the input signals.

A keyboard is a common input device in which depressing a key sends a signal to the computer. Software decodes the signal and produces a character on the display or initiates a programming sequence. A keyboard is a collection of one-dimensional input devices because each key can only provide a single input. For example, the cursor keys on a keyboard can move an on-screen cursor in a single direction, but not simultaneously in two directions.

A two-dimensional input device can provide signals to a computer to simultaneously control two dimensions, or software variables. An early two-dimensional input device that is still in common use today is known vernacularly as a mouse. In basic terms a mouse is a palm-sized housing that surrounds a rubber-coated ball which protrudes from a flat, bottom surface of the housing. Transducers within the housing detect rotation of the ball in two directions. When the mouse is placed on a desk, the ball likewise rests on the desk and motion of the mouse housing on the desk causes the ball to rotate within the housing and move the transducers. The transducers translate the ball's rotation into electrical signals that are provided to a computer. By moving the mouse on a surface, such as a desktop, a user may control aspects of a computer program, such as an on-screen cursor. One or more buttons are located on top of the housing that can be depressed to further control the computer software.

A mouse is a relative pointing device because there are no defined limits to the mouse's movements and because its placement on a surface does not map directly to a specific screen location. The mouse is two-dimensional because the mouse has a two-direction detection device that can detect mouse movement along two directions simultaneously and provide two-dimensional input to a computer. For example, a mouse may move a computer display cursor in two dimensions (e.g., vertically and horizontally) simultaneously.

Input devices are a means by which a computer user provides input signals to a computer. The processing of the input signals is determined by the computer software operating when the signals are received. Thus, different computer applications use input device signals in different ways.

Drafting programs accept mouse input to control a size or location of lines, or other features such as doors and windows. Games and simulations use mouse input to navigate through an on-screen environment. Moving the mouse over a physical, horizontal desktop is translated to motion in a virtual, vertical X–Y Cartesian surface on a computer display.

However, if a computer simulation requires movement in more than two dimensions, the two-dimension input device presents limitations. A known solution uses a mouse or keyboard button to toggle between two coordinate systems. For example, to use a mouse to control flying through three dimensional X–Y–Z space may provide that the mouse, in default mode, controls motion in the X–Y plane and pressing a button allows the mouse to control movement in the Y–Z plane. This system converts the mouse between coordinate systems—it does not permit simultaneous input in more than two-dimensions.

Other computer input devices include a touch sensitive pad, a trackball and a joystick. The touch pad is a flat panel that detects a user's finger on its surface and provides input signals to a computer. A trackball has a housing with a spherical ball protruding from a top surface of the housing. A user can directly manipulate the ball; transducers sense rotation of the ball and provide two-dimensional input signals to a computer. A joystick has a base with a protruding elongate member that pivots about its connection to the base; sensors detect the member's pivot and provide corresponding input signals to a computer.

At least one input device seeks to provide a combined mouse and trackball. U.S. Pat. No. 5,063,289 discloses a housing that captures a single, rotatable ball that protrudes from the housing. The ball is coupled to transducers that detect relative rotation of the ball and provide input signals to a computer in a conventional manner. The device of the '289 patent can be converted between a mouse and a trackball by inverting the device and adjusting a cover portion to accommodate the desired use. Though convertible, the device of the '289 patent provides signals comparable to a conventional mouse or trackball. This device does not provide more than a two-dimensional input.

Accordingly, the prior art does not provide an input device having a multi-dimensional signal that provides input of more than two-dimensions simultaneously.

SUMMARY OF THE INVENTION

The present invention solves a long standing problem associated with prior art input devices by providing an input device having multiple, multi-directional detection devices that can provide a multi-dimensional signal, having more than two dimensions, simultaneously. The present invention includes at least two, multi-directional detection devices that each provide multi-dimensional signals indicative of a computer user's control, or operation, of the input device. Thus, a user may control the input device of the present invention to provide an input signal to a computer indicative of more than two dimensions simultaneously. The effect of the multi-dimensional input on a computer program is dictated by the programming.

A first, preferred embodiment of the input device of the present invention includes first and second two-directional detection devices that can be simultaneously operated by a computer user to provide a simultaneous four-dimensional input signal to a computer to control aspects of software operating on the computer. Preferably, the first detection device is a first ball located within the housing and protruding from a bottom surface of the housing. Encoders detect rotation of the first ball. Motion of the housing on a horizontal surface rotates the first ball, which rotation is sensed by the encoders that produce a signal that is conveyed to circuitry located in the housing. Preferably, the second detection device is a second ball that partially protrudes from a top surface of the housing and can be manipulated by a user simultaneously with motion of the housing. Separate encoders detect the rotation of the second ball and provide signals to the onboard circuit. The circuit combines the signals and provides a multi-dimensional signal to a computer.

Other embodiments of the invention include other types and arrangements of detection devices and housing designs to facilitate operation of the detection devices. The following description describes the best mode and preferred embodiments of the present invention to enable a person skilled in the art to make and use the claimed invention. The claims that follow the description particularly point out and distinctly claim the subject matter regarded as the invention.

DESCRIPTION OF THE PREFERRED EMBODIMENTS

Figure 1:
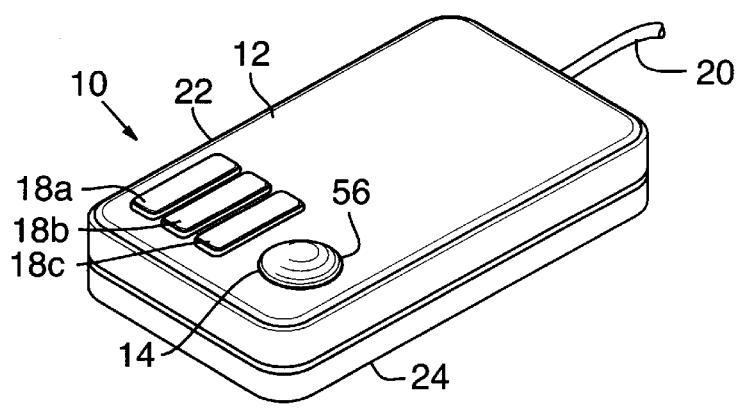
FIG. 1 is a perspective view of a first preferred embodiment of an input device of the present invention.
Figure 2:
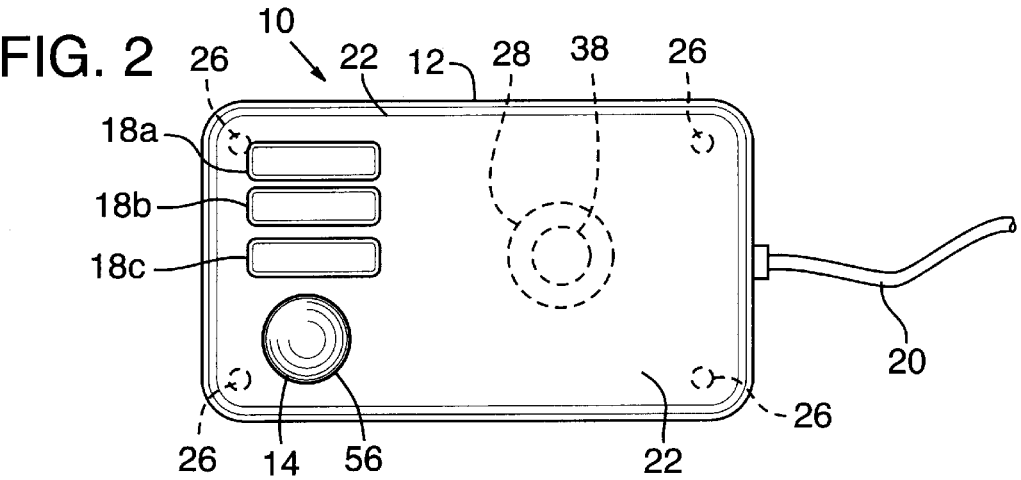
FIG. 2 is a top plan view of the input device of FIG. 1.
Figure 3:
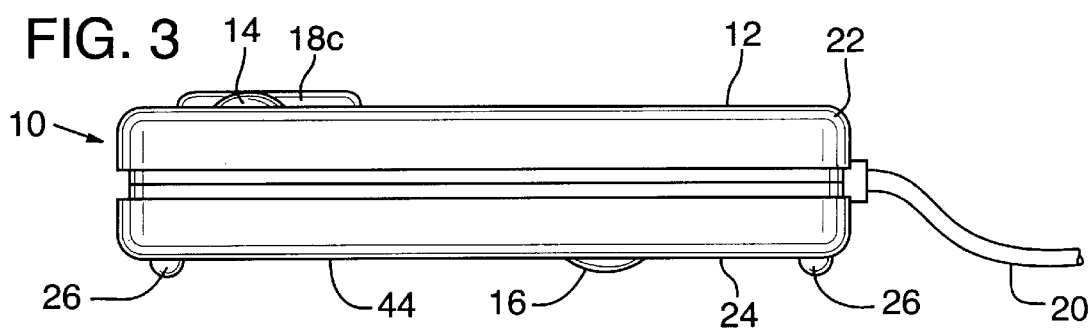
FIG. 3 is a left side elevation view of the input device of FIG. 1.
Figure 4:
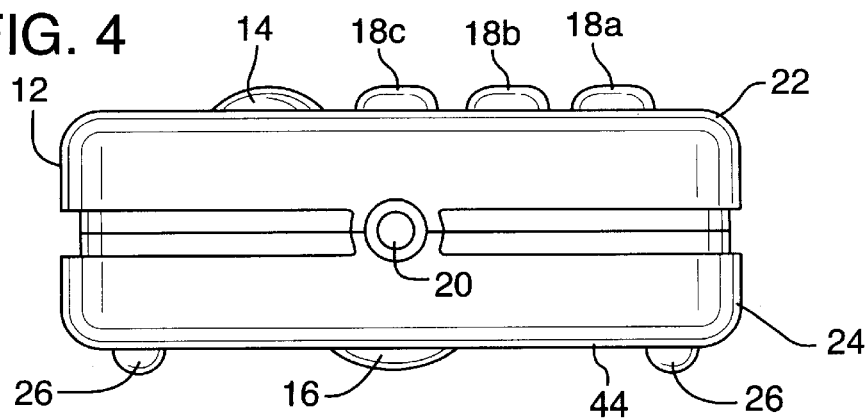
FIG. 4 is a rear elevation view of the input device of FIG. 1.

With reference to FIGS. 1–4, a first, preferred embodiment of the present invention is described. A computer input device 10 includes a housing 12 supporting a first detection device 14 and a second detection device 16. Also, located on the housing are a plurality of selector buttons 18a, 18b, and 18c, and extending from the housing is an electrical cable 20 for connection to a computer (not shown) to convey signals from the input device to the computer.

Signals from the input device 10 are received at a computer via cable 20. Computer software operating in the computer decodes the signals from the input device and controls aspects of the computer or software in accordance with the signals. A common use of an input device is to control the position of a cursor on a computer display, such as a cathode ray tube. Desktop motion of a prior art input device such as a mouse is translated into X–Y Cartesian plane motion of the cursor on the display. When the cursor is positioned over an on-screen icon and a selector button is operated, an action associated with the icon may be initiated. As noted above, prior art input devices are limited to two-dimensional input, e.g., X–Y Cartesian coordinates. Software programming to decode electrical signals from input devices and to perform operations in response to the decoded signals is known in the art.

The present invention provides first and second detection devices 14 and 16 that can be simultaneously operated by one hand of an operator to provide more than two degrees of dimensional input to a computer simultaneously. Simultaneous operation of the first and second detection devices provide corresponding signals to a circuit 46 which in turn provides signals to the computer via cable 20.

Exemplarily, the housing 12 comprises an upper portion 22 and a lower portion 24 that mate and seal an inner chamber 25 of the housing from environmental contaminants such as dust and foreign objects. The housing portions 22 and 24 are coupled by fasteners such as screws or plastic stakes that are gripped by a detent in a mating receptacle in the opposing portion. The lower portion 24 of the housing may be provided with low-friction nubs 26 on an exterior bottom surface 44 that support the input device at a predetermined height on a supporting surface, such as a desktop, and upon which the input device can slide.

In a preferred, first embodiment, the second detection device is a ball 28 in contact with orthogonal, elongate encoders 30 and 32 that detect rotation of the ball and transduce the ball rotation into electrical signals indicative of that rotation. The ball 28 is located in the chamber 25 and partially protrudes through an opening 38 located in the bottom surface 44. When the housing 12 rests on a substantially horizontal surface, the ball 28 rests in the opening 38 under the force of gravity. The nubs 26 determine the height of the housing above the desktop surface and are sized to permit the ball 28 to rest on the desktop through the opening 38. Preferably, the ball 28 is provided with a high friction outer surface, such as rubber. Thus, movement of the housing 12 across the desktop causes the ball to roll on the desktop and rotate within the housing, which rotation is detected by the encoders 30 and 32.

Figure 5:
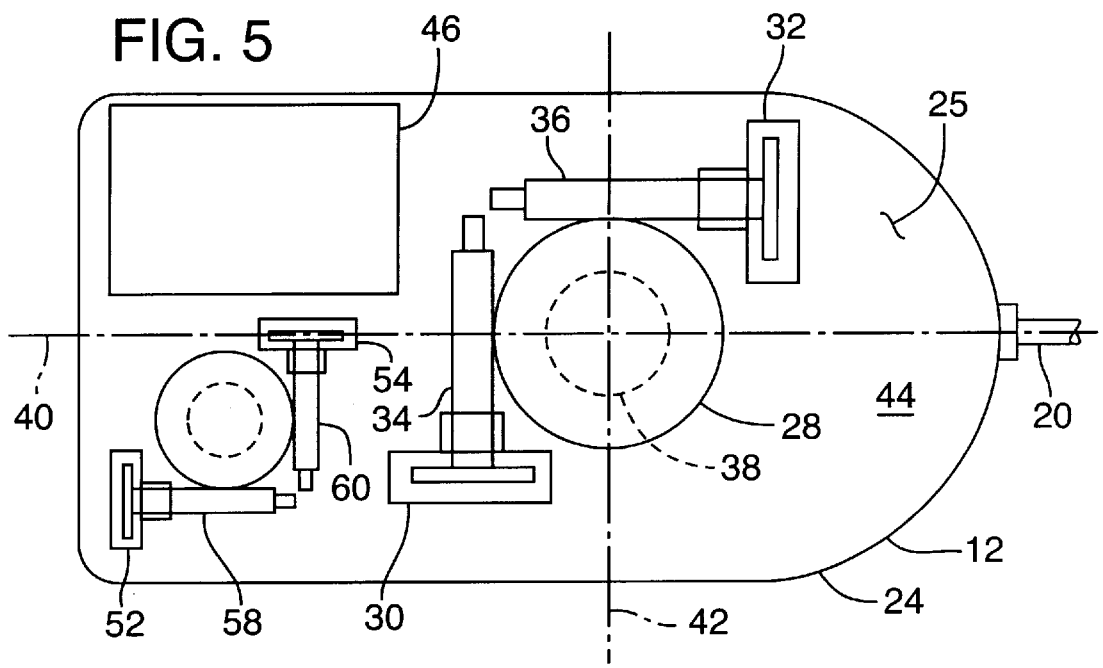
FIG. 5 is a top plan view of the input device of the present invention wherein an upper portion of the housing is removed to show an exemplary first embodiment of detection devices that provide signals to a computer that are indicative of a user's input. The housing shape shown in FIG. 5 is an alternative embodiment shape.

Shown exemplarily in FIG. 5, encoder 30 detects translation of the housing along a longitudinal axis 40 of the housing and shall be referred to as Y-axis encoder 30, which provides a Y-axis signal. Encoder 32 detects translation of the housing 12 along a lateral axis 42 and shall be referred to as X-axis encoder 32, which provides an X-axis signal. The Y-axis encoder 30 is coupled to a driving shaft 34 that is in frictional contact with the ball 28. Rotation of the ball causes the shaft to rotate, which drives the encoder. The encoder then outputs a quadrature electrical signal to an on-board circuit 46. This quadrature signal corresponds to changes in the translational position of the housing 12 along the longitudinal axis 40.

Similarly, X-axis encoder 32 is coupled to a driving shaft 36 that is in frictional contact with the ball 28. The encoder 32 senses rotation of ball 28 through rotation of the driving shaft 36 and outputs a quadrature signal to the on-board circuit 46. This quadrature signal corresponds to translational movement along the lateral axis 42 of the housing 12 and ball 28.

An appropriate biasing member (not shown) may be used to apply pressure against ball 28 to keep the ball in contact with shafts 34 and 36, as is known in the art.

In this first preferred embodiment, the first detection device 14 is a spherical ball 50 in frictional contact with orthogonal, elongate encoders 52 and 54 that detect rotation of the ball 50 and transduce that rotation into a signal indicative of that rotation. The ball 50 is located within the housing 12 and partially protrudes through an opening 56 located on an upper surface 56 of the upper portion 22 of the housing. The ball 50 rests on and frictionally engages driving shafts 58 and 60 of the encoders 52 and 54, respectively. Rotational motion of the ball 50 rotates the shafts 58 and 60, which rotate the encoders 52 and 54, respectively, which in turn produce quadrature signals that are sent to the on-board circuit 46. Rotation of the ball 50 may be resolved into rotation about the longitudinal axis 40 and lateral axis 42. Rotation about the longitudinal axis 40 rotates the shaft 58 and encoder 52, which provides an X'-axis signal. Rotation about the lateral axis 42 rotates the shaft 60 and encoder 54, which provides a Y'-axis signal.

Note, it is also contemplated to provide the input device 10 with its own resident power source and to transmit data signals from the input device to the computer using wireless transmission technology, such as infrared or radio frequency transmission.

Preferably, a small circuit 46 is provided within the housing 12 to receive the signals produced by the encoders 30, 32, 52, and 54. The circuit would provide the signals to the computer via cable 20, or through other means described herein. Such circuits are known in the art.

A user may rest the input device on a substantially flat, horizontal surface and simultaneously operate the first and second detection devices to produce a signal indicative of four-dimensions: X-axis, Y-axis, X'-axis, and Y'-axis. Moving the housing on the surface causes the ball 28 to rotate within the housing, which motion is encoded by encoders 30 and 32. Simultaneously, the user may use a finger to rotate the ball 50, which motion is encoded by encoders 52 and 54. Circuitry 46 in the housing 12 receives the encoder signals X-axis, Y-axis, X'-axis, and Y'-axis and provides a multi-dimensional signal to the cable 20 which conducts the signal to a computer.

By way of example, the signals created by motion of the ball 28 and encoders 30 and 32 may be used to move a cursor in the X–Y plane of a computer display. Signals created by rotation of the ball 50 and encoders 52 and 54 may be used to scroll an on-screen document up/down and left/right on the computer display. Another example includes a computer walk-through in which software simulates a three-dimensional environment and input by the user determines the views presented to the user. In this example, the input device of the present invention may be used to provide commands to the software in which the second detection device provides signals that command the software to move forward/backward and left/right and the first detection device provides commands to rotate the views left/right and up/down without moving.

The selector buttons 18a, 18b, or 18c may be used to toggle the input device between dimension systems. Thus, software may receive the multi-dimensional signals corresponding with the X-axis, Y-axis, X'-axis, and Y'-axis signals and perform a first sequence of actions. Depressing a selector button 18 may instruct the software to treat future signals as corresponding with an alternate set of dimensional signals, e.g., r, θ, r' and θ'. In this manner, the input device of the present invention may provide six or eight dimensional input to the computer software.

Encoders 30, 32, 52, and 54 may be comprised of LED's and phototransistors. Alternatively, the encoders may be comprised of electromagnetic or optical devices or other types of motion detectors and/or decoders well known in the art of the present invention. So as to not unnecessarily obscure the present invention, some electrical components and circuitry have not been shown in the exemplary view of FIG. 5.

In an alternative embodiment, the first detection device may be a touch-sensitive pad that detects the touch and motion of a user's finger on the pad and produces a two-dimensional signal indicative of the motion. Alternatively, the first detection device may comprise a joystick that provides a two-dimensional signal in response to the position of the joystick. Other embodiments may include, as the first detection device, other multi-dimensional detection devices.

Further, in alternative embodiments, the second detection device may comprise a large pad and sensor, wherein the sensor is located on the bottom surface 24 of the housing 12 and the housing is located on the large pad. Motion of the housing on the pad is sensed and the sensor produces a two-dimensional signal in response to that motion. This embodiment may be implemented as an absolute pointing device whereby the housing's location on the large pad may be directly correlated with a specific location on the computer display.

Alternatively, the second detection device may comprise any sensor system that detects motion, or absolute position, of the housing and transduces that motion, or position, into a multi-dimensional signal. Examples of such a sensor system includes accelerometers, an instrumented gyroscope, and telemetry.

Figure 6:
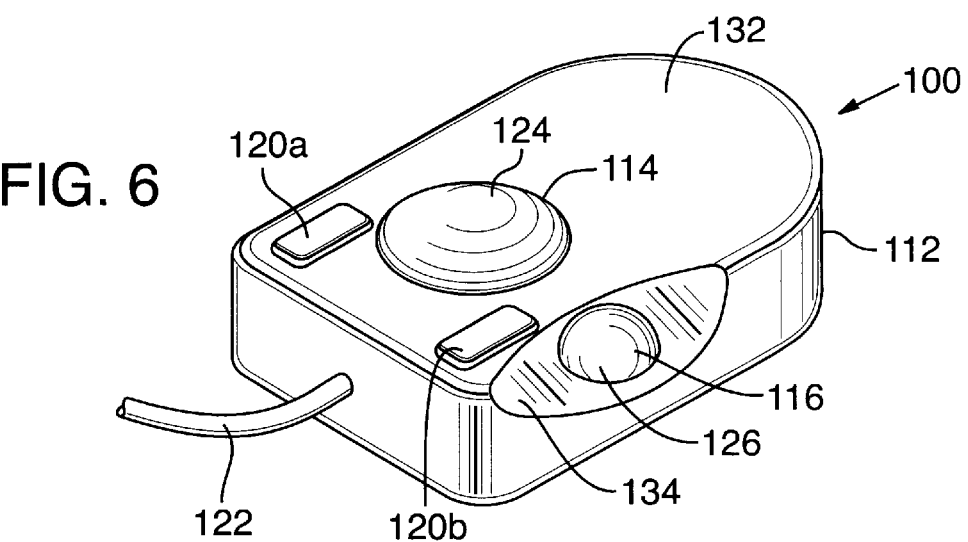
FIG. 6 is a perspective view of an alternative preferred embodiment of an input device of the present invention.
Figure 7:
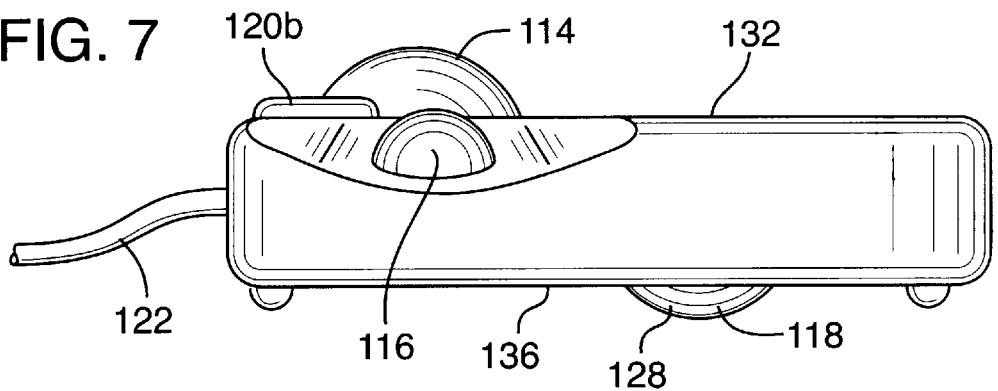
FIG. 7 is a side elevation of view of the input device FIG. 6.

FIGS. 6 and 7 show an additional alternative embodiment of the present invention. An input device 100 includes a housing 112 having a first multi-directional detection device 114, a second multi-directional detection device 116, and a third multi-directional detection device 118. Selector buttons 120a and 120b may be provided as desired. As in the embodiments disclosed above, a cable 122 is provided to conduct signals from the input device 100 to a computer (not shown).

In this embodiment, the detection devices 114, 116, and 118 are arranged to permit simultaneous operation by one hand of an operator. The first detection device 114 is located on a top surface 132 of the housing, the second detection device 116 is located on a beveled-side surface 134 of the housing. And, the third detection device 118 is located on a bottom surface 136 of the housing. Accordingly, motion of the housing 112 operates the third detection device 118 as in the embodiments described above. Simultaneous with motion of the housing 112, the first input device 114 may be operated by a user's fore finger or middle finger. And, simultaneously with movement of the housing and manual operation of the first detection device 114, the user may simultaneously operate the second detection device 116 with a thumb.

As in the embodiments disclosed above, each detection device 114, 116, and 118 provides a multi-dimensional signal to an on-board circuit, located within the housing 112, that provides a multi-dimensional signal to a computer via cable 122.

In the embodiment shown in FIGS. 6 and 7, the first, second, and third detection devices 114, 116, and 118 are represented as spheres 124, 126, and 128, respectively, that are partially located in the housing 112 and protruding from the housing a sufficient amount to permit contact with an operator or supporting surface. Accordingly, the detection devices of the present embodiment operate in a substantially similar manner to the detection devices disclosed in the embodiments described above wherein rotation of a sphere operates orthogonal encoders (not shown) that produce signals indicative of the rotation of the sphere. Other types of detection devices, described above, may be used to permit simultaneous input of three or more multi-directional detection devices as described above.

Other embodiments may have different arrangements of detection devices that permit simultaneous operation by a single hand of a user.

Figure 8:
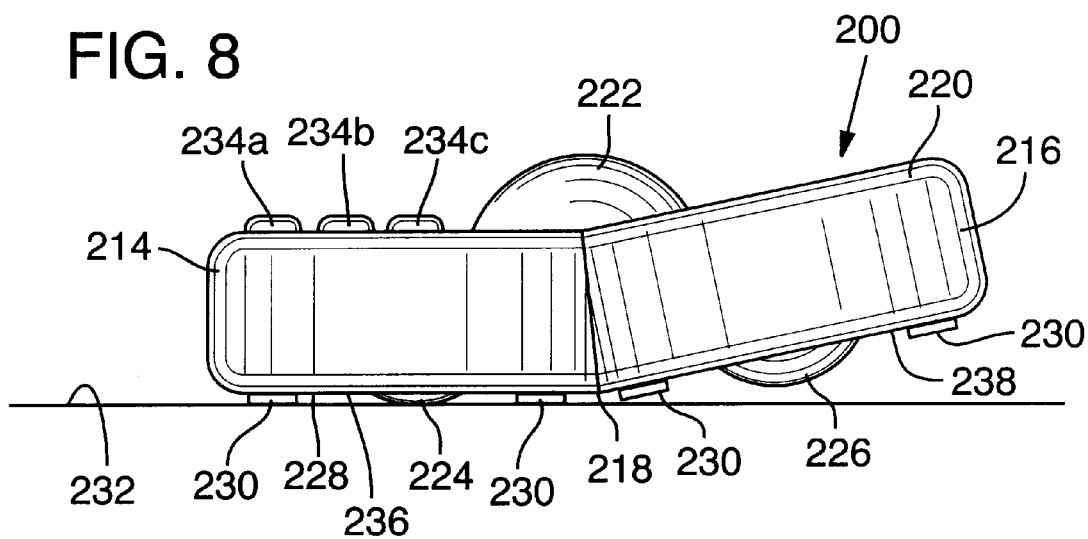
FIG. 8 is a rear elevation view of another alternative embodiment of an input device of the present invention.
Figure 9:
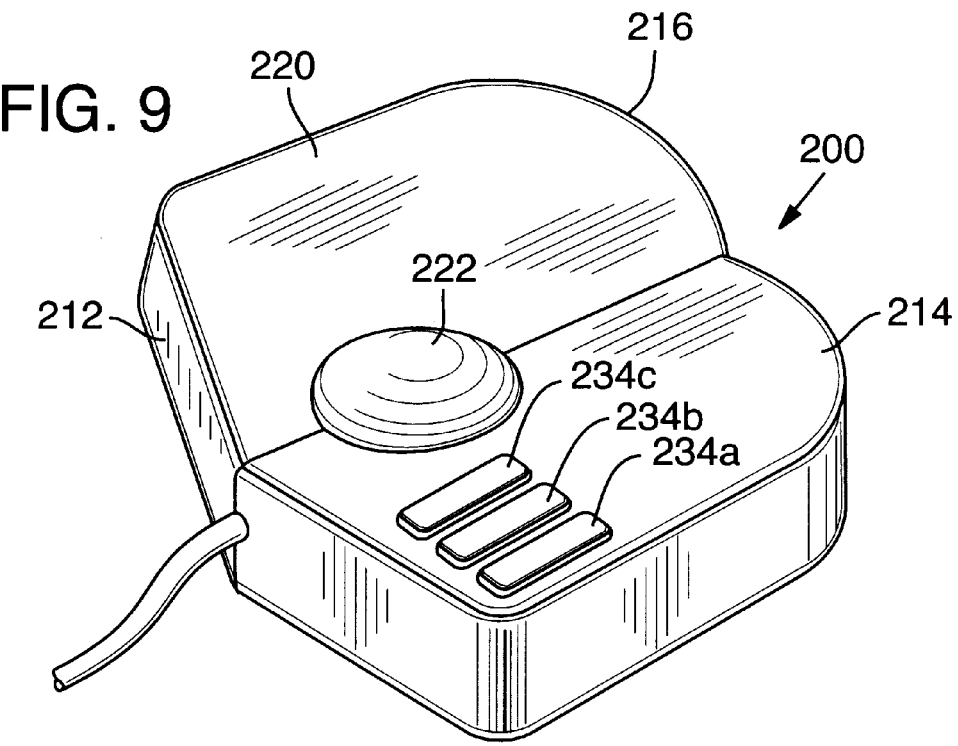
FIG. 9 is a top perspective view of the input device of FIG. 8.

A further alternative embodiment is shown in FIGS. 8 and 9 wherein an input device 200 includes a housing 212 having a left portion 214 and a right portion 216. Preferably, the left and right portions are of unitary construction, but other designs are also suitable. A rocker ridge 218 defines the separation between the left and right portions. Located on a top surface 220 of the housing 212 is a first multi-directional detection device 222. Located on a bottom surface 228 of the housing are a second multi-directional detection device 224 and a third multi-directional detection device 226. Nubs 230 may also be provided along the bottom surface to control the height of the housing 212 above a supporting surface 232. As in previous embodiments, selector buttons 234a, 234b, and 234c may be provided. Preferably, the second and third detection devices 224 and 226 are spheres in contact with rotary encoders as described above.

The second and third detection devices 224, 226 are located on different portions 214, 216 of the housing. Further, the left portion 214 and the right portion 216 have a left bottom portion 236 and a right bottom portion 238, respectively, that are substantially planar. However, the left bottom portion is not coplanar with the right bottom portion.

The housing 212 can rock left to right and right to left on the rocker ridge 218. In the orientation shown in FIG. 8, the housing 212 has been rocked to the left so that the plane of the left bottom portion is substantially parallel to the supporting surface 232 and the plane of the right bottom portion 238 is oblique to the supporting surface and the right portion 216 is raised above the supporting surface. In this orientation, the second detection device 224 is in contact with the supporting surface 232 and the third detection device 226 is raised above, and is not contacting, the supporting surface. Thus, motion of the housing 212, as oriented in FIG. 8, will operate the second detection device by causing rotation of its respective sphere (not separately numbered).

From the orientation of FIG. 8, the housing may be rocked to the right until the plane of the right bottom portion 238 is substantially parallel to the supporting surface 232 (and, preferably, nubs 230 on the right bottom surface contact the supporting surface). The plane of the left bottom portion 236 will then be oblique to the supporting surface and the left portion 214 will be raised above the supporting surface and the second detection device 224 will not be in contact with the supporting surface. Thus, when rocked to the right as described, the third detection device 226 will contact the supporting surface and motion of the housing 212 will operate the third detection device.

When the housing 22 is rocked to the left or right, and the housing is moved to operate the second or third detection device 224, 226, respectively, the first detection device 222 may be operated simultaneously. By way of example, in a computer walk-through environment, software simulates a three-dimensional environment and input by the user determines the point of observation of the user. In such a program, the signals created by motion of the housing 212 when rocked to the left may be used to move a point of observation in the X–Y plane of a computer display. Signals created by motion of the housing when rocked to the right may be used to move the point of observation in the X-Z plane of the computer display. The first detection device 222 may be operated simultaneously to provide signals that change the point of observation by rotating left-right and up-down.

The embodiment of FIGS. 8 and 9 show left and right portions 214 and 216 separated by a longitudinal rocker ridge 218. Alternatives of this embodiment could have fore and aft portions separated by a lateral rocker ridge. With fore and aft portions, the second detection device would be located on the fore portion and the third detection device would be located on the aft portion. Thus, a user would rock the housing fore and aft to operated the second or third detection devices, respectively. Other embodiments may provide a rocker ridge that is along an oblique orientation to the longitudinal or lateral axes.

In describing the operation of the input device of the present invention, reference has been made to simultaneous input of both detection devices; one by moving the housing and the other by operation by a user's finger. Other means for manipulating the detection devices may be used with alternative types of detection devices and alternative arrangements of the detection devices from the arrangement shown in the accompanying figures. Additionally, for purposes of this description and claims, a user's thumb is deemed to be a finger.

This specification sets forth the best modes for carrying out the invention and provides sufficient information to enable a person skilled in the art to make and use the invention. The specification further describes materials, shapes, configurations and arrangements of parts for making and using the invention. However, it is intended that the scope of the invention shall be limited by the language of the claims and the law of the land as pertains to valid U.S. patents.

What is claimed is:

1. A computer input device, comprising:

(a) a housing;

(b) a first multi-directional detection device coupled to the housing for detection of a first user input along a first and second axis of direction simultaneously, wherein the first multi-directional detection device provides a first multi-dimensional signal indicative of the first user input;

(c) a second multi-directional detection device coupled to the housing for detection of a second user input along a third and fourth axis of direction simultaneously, wherein the second multi-directional detection device provides a second multi-dimensional signal indicative of the second user input;

(d) wherein the first multi-directional detection device and the second multi-directional detection device are arranged on the housing to permit the first user input and the second user input to occur simultaneously; and (e) a third multi-directional detection device coupled to the housing for detection of a third user input along two axes of direction simultaneously, wherein the third multi-directional detection device provides a third multi-dimensional signal indicative of the third user input, and wherein the second detection device is located on a first lower surface of the housing and the third detection device is located on a second lower surface of the housing such that when the housing is oriented in a first orientation the second user input includes moving the housing on a supporting surface to provide the second multi-dimensional signal, and when the housing is oriented in a second orientation the third user input includes moving the housing to provide the third multi-dimensional signal and the first detection device is arranged on the housing to permit the first user input and the second user input simultaneously, and the first user input and the third user input simultaneously, respectively.

2. The input device of claim 1 further comprising a circuit coupled to the housing for receiving the first and second multi-dimensional signals and the circuit provides a third multi-dimensional signal indicative of the simultaneous generation of the first and second user input.

3. The input device of claim 1 wherein the first detection device provides the first multi-dimensional signal in accordance with movement of the housing and the second detection device provides the second multi-dimensional signal in accordance with direct manipulation of the second detection device by a user.

4. The input device of claim 1 wherein the first detection device is located on a top surface of the housing and the second detection device is located on a bottom surface of the housing.

5. The input device of claim 1 wherein the first detection device comprises a first ball in communication with a first encoder and rotation of the first ball operates the first encoder and the first encoder provides the first multi-dimensional signal and the second detection device comprises a second ball in communication with a second encoder and rotation of the second ball operates the second encoder to produce the multi-dimensional second signal.

6. The input device of claim 1 wherein the first detection device comprises a touch pad located on an upper surface of the housing and user contact with the touch pad provides the first multi-dimensional signal, and the second detection device comprises a sphere in communication with encoders and rotation of the sphere operates the encoders to produce the second multi-dimensional signal.

7. The input device of claim 1 wherein the first detection device comprises a joystick located on an upper surface of the housing and operation of the joystick provides the first multi-dimensional signal, and the second detection device comprises a sphere in communication with encoders and rotation of the sphere operates the encoders to provide the second multi-dimensional signal.

8. A computer input device for providing signals to a computer indicative of a user's operation of the input device, comprising:
 (a) a housing having a first portion and a second portion and wherein the housing includes a first orientation relative to a supporting surface and a second orientation relative to the supporting surface;
 (b) a first multi-directional detection device that can be operated by a user along two axes simultaneously and the first detection device provides a first multi-dimensional signal indicative of the user operation and wherein the first detection device is located on the first portion of the housing;
 (c) a second multi-directional detection device that can be operated by a user along two axes simultaneously and the second detection device provides a second multi-dimensional signal indication of the user operation and wherein the second detection device is located on the second portion of the housing;
 (d) whereby the first detection device can be operated by moving the housing when the housing is in the first orientation and the second detection device can be operated by moving the housing when the housing is in the second orientation; and
 a third multi-directional detection device that can be operated by a user along two axes simultaneously and the third detection device provides a third multi-dimensional signal indication of the user operation and wherein the housing includes an upper surface, a first lower surface on the first portion and a second lower surface on the second portion, and wherein the first detection device is located proximate the first lower surface and the second detection device is located proximate the second lower surface and the third detection device is located on the upper surface whereby the third detection device can be operated simultaneously with the first detection device when the housing is oriented in the first orientation and the third detection device can be operated simultaneously with the second detection device when the housing is oriented in the second orientation.

9. A computer input device for providing signals to a computer indicative of a user's operation of the input device, comprising
 (a) a housing having a first portion and a second portion and wherein the housing includes a first orientation relative to a supporting surface and a second orientation relative to the supporting surface;
 (b) a first multi-directional detection device that can be operated by a user along two axes simultaneously and the first detection device provides a first multi-dimensional signal indicative of the user operation and wherein the first detection device is located on the first portion of the housing; and
 (c) a second multi-directional detection device that can be operated by a user along two axes simultaneously and the second detection device provides a second multi-dimensional signal indication of the user operation and wherein the second detection device is located on the second portion of the housing;
 (d) whereby the first detection device can be operated by moving the housing when the housing is in the first orientation and the second detection device can be operated by moving the housing when the housing is in the second orientation;
 and wherein the housing includes an upper surface, a first lower surface, and a second lower surface, and a ridge separates the first lower surface from the second lower surface and in the first orientation the first lower surface is proximate the supporting surface to permit operation of the first detection device, and in the second orientation the second lower surface is proximate the supporting surface to permit operation of the second detection device.

10. The input device of claim 9 wherein the housing is elongate and the ridge is substantially linear and arranged substantially parallel to a longitudinal axis of the housing.

11. The input device of claim 9 wherein the housing is elongate and the ridge is substantially linear and arranged substantially parallel to a lateral axis of the housing.

12. A computer input device for providing signals to a computer indicative of a user's operation of the input device, comprising:
 (a) a housing having a first portion and a second portion and wherein the housing includes a first orientation relative to a supporting surface and a second orientation relative to the supporting surface;
 (b) a first multi-directional detection device that can be operated by a user along two axes simultaneously and the first detection device provides a first multi-dimensional signal indicative of the user operation and wherein the first detection device is located on the first portion of the housing; and
 (c) a second multi-directional detection device that can be operated by a user along two axes simultaneously and the second detection device provides a second multi-dimensional signal indication of the user operation and wherein the second detection device is located on the second portion of the housing;

(d) whereby the first detection device can be operated by moving the housing when the housing is in the first orientation and the second detection device can be operated by moving the housing when the housing is in the second orientation;

and wherein the first detection device is a first sphere and a first encoder to detection motion of the first sphere and the second detection device is a second sphere and a second encoder to detect motion of the second sphere, wherein in the first orientation the first sphere contacts the supporting surface and movement of the housing rotates the first sphere within the housing and the first encoder provides a first multi-dimensional signal indicative of the user's operation of the input device, and in the second orientation the second sphere contacts the supporting surface and movement of the housing rotates the second sphere within the housing and the second encoder provides a second multi-dimensional signal indicative of the user's operation of the input device.

* * * * *